(12) United States Patent
Goudey

(10) Patent No.: US 11,425,870 B1
(45) Date of Patent: Aug. 30, 2022

(54) MACROALGAE FARMING INCLUDING ATTACHING SEAWEED TO A LINE

(71) Applicant: Clifford A. Goudey, Newburyport, MA (US)

(72) Inventor: Clifford A. Goudey, Newburyport, MA (US)

( * ) Notice: Subject to any disclaimer, the term of this patent is extended or adjusted under 35 U.S.C. 154(b) by 448 days.

(21) Appl. No.: 16/558,294

(22) Filed: Sep. 2, 2019

Related U.S. Application Data

(60) Provisional application No. 62/727,982, filed on Sep. 6, 2018.

(51) Int. Cl.
*A01G 33/00* (2006.01)
*A01G 9/12* (2006.01)

(52) U.S. Cl.
CPC ............. *A01G 33/00* (2013.01); *A01G 9/128* (2013.01)

(58) Field of Classification Search
CPC .......... A01G 33/00; A01G 9/128; A01G 9/12; A01G 17/02; A01G 17/04; Y10T 24/4755; Y10T 24/3484; Y10T 24/3495; Y10T 24/3444; Y10T 24/44291; A01K 87/04
USPC ....................... 47/41.12, 41.15, 46, 47; 43/24
See application file for complete search history.

(56) References Cited

U.S. PATENT DOCUMENTS

| | | | | |
|---|---|---|---|---|
| 234,812 A | * | 11/1880 | Richardson | A01K 87/04 43/24 |
| 263,484 A | * | 8/1882 | Chubb | A01K 87/04 43/24 |
| 338,212 A | * | 3/1886 | Whiting | A01K 87/04 43/24 |
| 432,305 A | * | 7/1890 | Foley | A47G 33/105 24/339 |
| 451,097 A | * | 4/1891 | Wilkinson | A47B 73/00 24/339 |
| 478,092 A | * | 7/1892 | Cushman | B62J 11/00 24/339 |
| 488,088 A | * | 12/1892 | Pettibone | A41F 15/02 269/254 R |
| 545,641 A | * | 9/1895 | Wilson | B43K 23/001 24/339 |
| 670,144 A | * | 3/1901 | Bond | F16M 11/00 126/30 |
| 1,063,402 A | * | 6/1913 | Whistler | A01K 87/04 43/24 |
| 1,318,850 A | * | 10/1919 | De Yong | A45F 5/021 24/339 |

(Continued)

FOREIGN PATENT DOCUMENTS

| | | | | |
|---|---|---|---|---|
| FR | 2231310 A1 | * | 12/1974 | ............ A01G 9/128 |
| FR | 2987970 A1 | * | 9/2013 | ............ A01G 9/122 |
| KR | 100583905 B1 | * | 5/2006 | ............ A01G 9/128 |

*Primary Examiner* — Peter M Poon
*Assistant Examiner* — Morgan T Jordan
(74) *Attorney, Agent, or Firm* — Ira D. Blecker, Esq.

(57) ABSTRACT

An apparatus for attaching vegetative propagules to a longline that may include a clip portion having a curved area sized to receive a stem of a vegetative propagule and having an opening to the curved area smaller than the curved area to secure the vegetative propagule in the curved area; a tapered barrel that is inserted into a longline; and a rigid connection by a tower between the clip portion and the tapered barrel. Also disclosed is a macroalgae farm including the apparatus for attaching vegetative propagules to a longline.

15 Claims, 4 Drawing Sheets

(56) References Cited

U.S. PATENT DOCUMENTS

| | | | | |
|---|---|---|---|---|
| 1,360,988 A * | 11/1920 | Potstada | F21V 21/088 | 24/339 |
| 1,378,262 A * | 5/1921 | Meyer | G09F 5/042 | 43/24 |
| 1,444,063 A * | 2/1923 | Davis | A01K 87/04 | 43/24 |
| 1,469,296 A * | 10/1923 | Davis | B21D 53/00 | 72/377 |
| 1,686,678 A * | 10/1928 | Burke | H02G 11/003 | 24/339 |
| 1,899,509 A * | 2/1933 | Lapin | B43K 23/001 | 24/339 |
| 1,925,431 A * | 9/1933 | Bishop | A62C 33/00 | 24/339 |
| D108,720 S * | 3/1938 | Morgan | D22/143 | |
| 2,128,005 A * | 8/1938 | Lombard | F16B 19/04 | 24/339 |
| 2,146,964 A * | 2/1939 | Legat | B21D 53/00 | 72/340 |
| 2,448,900 A * | 9/1948 | Mayo | B42F 17/02 | 24/339 |
| 2,502,845 A * | 4/1950 | Hoffman | A01K 87/04 | 29/523 |
| 2,618,902 A * | 11/1952 | Prescott | A01G 9/128 | 248/87 |
| 2,619,714 A * | 12/1952 | Dornaus | A01K 87/04 | 29/525 |
| 2,682,127 A * | 6/1954 | Binder | A01K 97/10 | 24/489 |
| 2,718,085 A * | 9/1955 | Bean | A01K 87/04 | 43/24 |
| 2,724,204 A * | 11/1955 | Wiglesworth | A01K 87/04 | 43/24 |
| 2,746,701 A * | 5/1956 | Carpenter | F16L 3/227 | 24/339 |
| 2,762,154 A * | 9/1956 | Marke | A01K 87/04 | 242/157 R |
| 2,778,141 A * | 1/1957 | Haas | A01K 87/04 | D22/143 |
| 2,872,751 A * | 2/1959 | Mayfield | A01K 87/04 | 43/24 |
| 2,914,882 A * | 12/1959 | Marke | A01K 87/04 | D22/143 |
| 2,992,506 A * | 7/1961 | Garbolino | A01K 87/04 | D22/143 |
| 3,010,256 A * | 11/1961 | Ise | A01G 17/12 | 47/42 |
| 3,063,186 A * | 11/1962 | Ward, IV | A01K 87/04 | 43/24 |
| 3,066,900 A * | 12/1962 | Holton | F16L 3/04 | 24/339 |
| 3,088,702 A * | 5/1963 | Orenick | F16L 3/233 | 24/339 |
| 3,120,938 A * | 2/1964 | Lucas | F16L 3/12 | 24/339 |
| 3,126,185 A * | 3/1964 | Christman | F16L 3/1236 | 174/164 |
| 3,154,281 A * | 10/1964 | Frank | H05K 3/301 | 248/220.31 |
| 3,163,391 A * | 12/1964 | Adams | H01H 85/202 | 24/339 |
| 3,210,881 A * | 10/1965 | Wilson | A01K 87/04 | 242/157 R |
| 3,235,209 A * | 2/1966 | Seckerson | F16L 3/04 | 24/339 |
| 3,477,677 A * | 11/1969 | Hindley | A47F 5/0823 | 24/339 |
| 3,501,117 A * | 3/1970 | Soltysik | F16L 3/221 | 24/339 |
| 3,515,363 A * | 6/1970 | Fisher | H02G 3/30 | 24/339 |
| 3,641,696 A * | 2/1972 | Fleischer | A01K 87/04 | 242/157 R |
| 3,776,092 A * | 12/1973 | Seckerson | F16B 21/086 | 24/339 |
| 3,905,570 A * | 9/1975 | Nieuwveld | F16L 3/13 | 24/339 |
| 4,023,758 A * | 5/1977 | Yuda | F16L 3/13 | 248/74.3 |
| 4,030,224 A * | 6/1977 | Dorph | A01K 87/04 | 43/24 |
| 4,050,187 A * | 9/1977 | Geiger | A01G 17/04 | 24/339 |
| 4,165,582 A * | 8/1979 | Skaug | A01G 17/06 | 47/47 |
| 4,176,494 A * | 12/1979 | Boucher | A01G 9/122 | 256/50 |
| 4,186,508 A * | 2/1980 | Howald | A01K 87/04 | 156/169 |
| 4,334,379 A * | 6/1982 | Nelli | A01K 87/04 | 43/24 |
| 4,534,129 A * | 8/1985 | Stuckey | A01G 9/128 | 47/47 |
| 4,559,677 A * | 12/1985 | Tracy | B62J 7/08 | 24/300 |
| 4,564,163 A * | 1/1986 | Barnett | H02G 3/32 | 24/297 |
| 4,669,688 A * | 6/1987 | Itoh | H02G 3/30 | 24/297 |
| D291,532 S * | 8/1987 | Hill | D8/382 | |
| D298,645 S * | 11/1988 | Miyata | D8/356 | |
| 4,798,569 A * | 1/1989 | Alderfer | F16G 3/00 | 138/155 |
| 4,880,133 A * | 11/1989 | Cullinane | A47C 7/62 | D11/146 |
| 5,035,074 A * | 7/1991 | Tylkowski | A01K 87/04 | 43/24 |
| 5,186,572 A * | 2/1993 | Frano | F16L 55/10 | 403/251 |
| 5,274,887 A * | 1/1994 | Fudaki | F16G 15/08 | 24/265 H |
| 5,491,881 A * | 2/1996 | Collins | B21D 35/00 | 72/337 |
| 5,542,209 A * | 8/1996 | Sheu | A01G 9/128 | 24/339 |
| 5,560,139 A * | 10/1996 | Lembree | A01K 87/04 | 43/24 |
| 5,769,783 A * | 6/1998 | Fowler | A61B 17/0293 | 600/226 |
| 5,802,759 A * | 9/1998 | Ohmura | A01K 87/04 | D22/143 |
| D409,713 S * | 5/1999 | Ohmura | D22/143 | |
| 5,979,110 A * | 11/1999 | Tai | A01G 9/128 | 24/339 |
| 6,050,225 A * | 4/2000 | Stamps | A01K 11/004 | 119/200 |
| 6,067,742 A * | 5/2000 | Ohmura | A01K 87/04 | 43/24 |
| 6,117,072 A * | 9/2000 | Fowler, Jr. | A61B 17/0293 | 600/210 |
| 6,219,954 B1 * | 4/2001 | Ohmura | A01K 87/04 | 43/24 |
| 6,282,830 B1 * | 9/2001 | Henry | A01K 91/065 | 43/4.5 |
| 6,286,190 B1 * | 9/2001 | Friend | A01K 27/005 | 24/115 F |
| 6,520,116 B1 * | 2/2003 | Jefferds | A01K 61/54 | 119/238 |
| 6,539,593 B2 * | 4/2003 | Morris | B63B 17/02 | 24/265 CD |
| 6,612,065 B1 * | 9/2003 | Blanchette | A01K 87/00 | 43/24 |
| 6,636,679 B1 * | 10/2003 | Mereness | G02B 6/4471 | 385/136 |
| 7,093,329 B1 * | 8/2006 | Chiu | A63B 21/0552 | 24/300 |

(56) References Cited

U.S. PATENT DOCUMENTS

| | | | | |
|---|---|---|---|---|
| 7,152,367 B2* | 12/2006 | Mastronardi | .......... | A01G 17/10 24/345 |
| 7,163,169 B1* | 1/2007 | Rosseau | ............... | A01K 91/065 43/4.5 |
| 7,225,581 B1* | 6/2007 | Kirk | ....................... | A01K 87/00 43/24 |
| 7,418,926 B2* | 9/2008 | Kung | ................... | A01K 27/005 119/769 |
| 7,774,864 B2* | 8/2010 | Carlson | .............. | A41D 13/0012 2/249 |
| 7,805,816 B1* | 10/2010 | Thorne, III | ........... | B60P 7/0823 24/301 |
| 7,992,263 B2* | 8/2011 | Uehara | ..................... | A45F 5/00 24/265 H |
| 8,657,727 B1* | 2/2014 | Kassel | ................... | A63B 21/4001 482/122 |
| 9,506,274 B1* | 11/2016 | Miracle | ............... | E05B 73/0005 |
| 9,548,597 B2* | 1/2017 | Vacca | ....................... | H02G 3/32 |
| 10,257,990 B1* | 4/2019 | Goudey | ................. | B63B 35/00 |
| 2002/0129772 A1* | 9/2002 | Gagnon | ................ | A01K 61/54 119/237 |
| 2010/0294203 A1* | 11/2010 | Janke | ..................... | A01K 61/54 119/236 |
| 2012/0000124 A1* | 1/2012 | Posa | ........................ | A01G 9/12 47/45 |
| 2014/0345184 A1* | 11/2014 | Holcomb | ............... | A01K 87/04 43/24 |

* cited by examiner

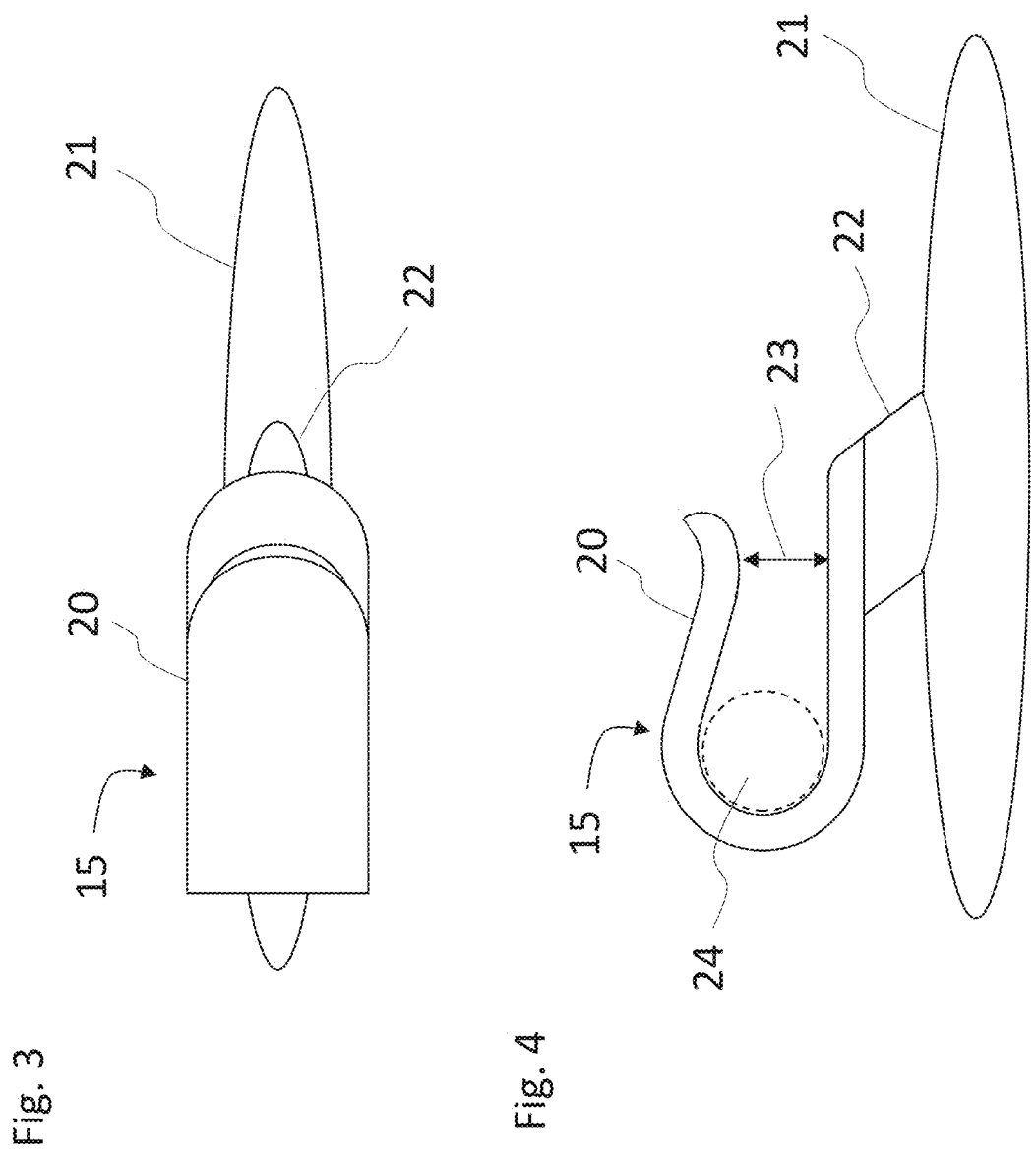

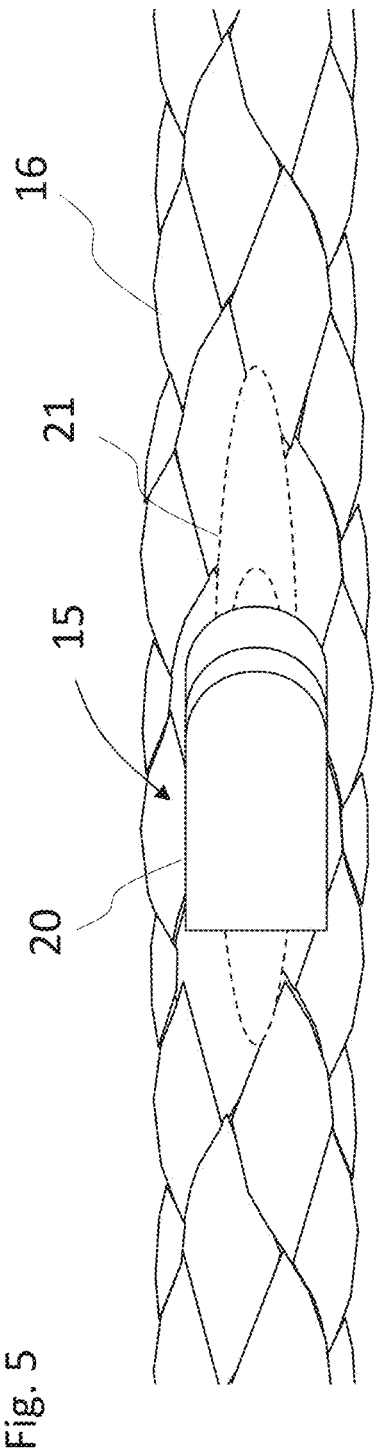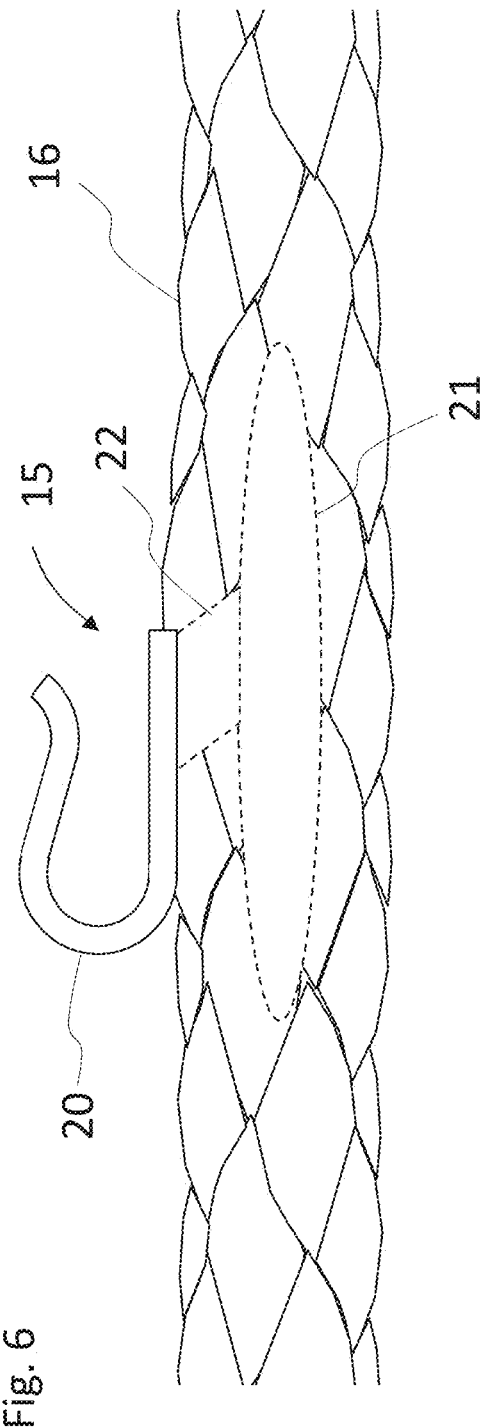

MACROALGAE FARMING INCLUDING ATTACHING SEAWEED TO A LINE

STATEMENT REGARDING FEDERALLY SPONSORED RESEARCH OR DEVELOPMENT

This invention was developed in part during the conduct of U.S. Department of Energy Contract Number DE-AR0000912, a project titled "The Development of Techniques for Tropical Seaweed Cultivation and Harvesting." The government has certain rights in the invention.

TECHNICAL FIELD

The present invention relates to the growing of vegetatively propagated types of macroalgae on and in the ocean. Further, the present invention relates to the growing of certain types of seaweed that are grown from propagules. In particular, this invention relates to the common practice of attaching these propagules to a line suspended in seawater whereby the line is suspended horizontally below the surface at a depth that allows the availability of sunlight and nutrients. The device and methods described herein present a means of farming these seaweeds for the purpose of providing food, chemical feed stocks, and a biomass suitable for the production of biofuels.

BACKGROUND OF THE INVENTION

As the fossil-fuel age draws to a close, an increasing proportion of energy and products will have to come from biomass. At the same time, due to increased population and current food consumption trends, the world will need to produce 50-70% more food by 2050. Using conventional production techniques, these two paradigm shifts would require the increased use of land space for crops, which may be difficult given other land-use requirements. However, the oceans present a solution through the production of various seaweeds, or macroalgae, that can serve multiple purposes by both feeding humanity and powering civilization. Given the vastness of the oceans and the rapid growth rates of seaweeds, a significant portion of our food and energy needs could be met by farming the oceans.

However, present methods of macroalgae farming are suitable only in shallow waters and require intense amounts of labor, making the practice feasible only in locations of extremely low wages. In order for these farming methods to become workable at deeper water depths and where labor costs are at first-world levels, methods for mechanization and scale-up are needed.

BRIEF SUMMARY OF THE INVENTION

The various advantages and purposes of the exemplary embodiments as described above and hereafter are achieved by providing, according to an aspect of the exemplary embodiments, an apparatus for attaching vegetative propagules to a longline comprising: a clip portion having a curved area sized to receive a stem of the vegetative propagule and having an opening to the curved area smaller than the curved area to secure the stem of the vegetative propagule in the curved area; a tapered barrel that is inserted into a longline; and a rigid connection by a tower between the clip portion and the tapered barrel.

According to another aspect of the exemplary embodiments, there is provided a macroalgae farm comprising: a longline on which a vegetative propagule may be grown; a clip portion having a curved area sized to receive a stem of the vegetative propagule and having an opening to the curved area smaller than the curved area to secure the vegetative propagule in the curved area; a tapered barrel that is inserted into the longline; and a rigid connection by a tower between the clip portion and the tapered barrel.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description, which follows taken in conjunction with the accompanying drawings in which:

FIG. 3 represents a top view of a device of the exemplary embodiments that attaches propagules to the longlines.

FIG. 4 represents a side view of the device of FIG. 3 that attaches propagules to the longlines.

FIG. 5 represents a top view of the device of FIG. 3 inserted in a longline.

FIG. 6 represents a side view of the device of FIG. 3 inserted in a longline.

DETAILED DESCRIPTION OF THE INVENTION

The apparatus described below presents a means of farming these seaweeds for the purpose of providing food, chemical feedstocks, and a biomass suitable for the production of biofuels. As will be explained, the present invention offers advantages over present methods and enables the practical and economical deployment of farmed macroalgae on the high seas.

Figure 1:
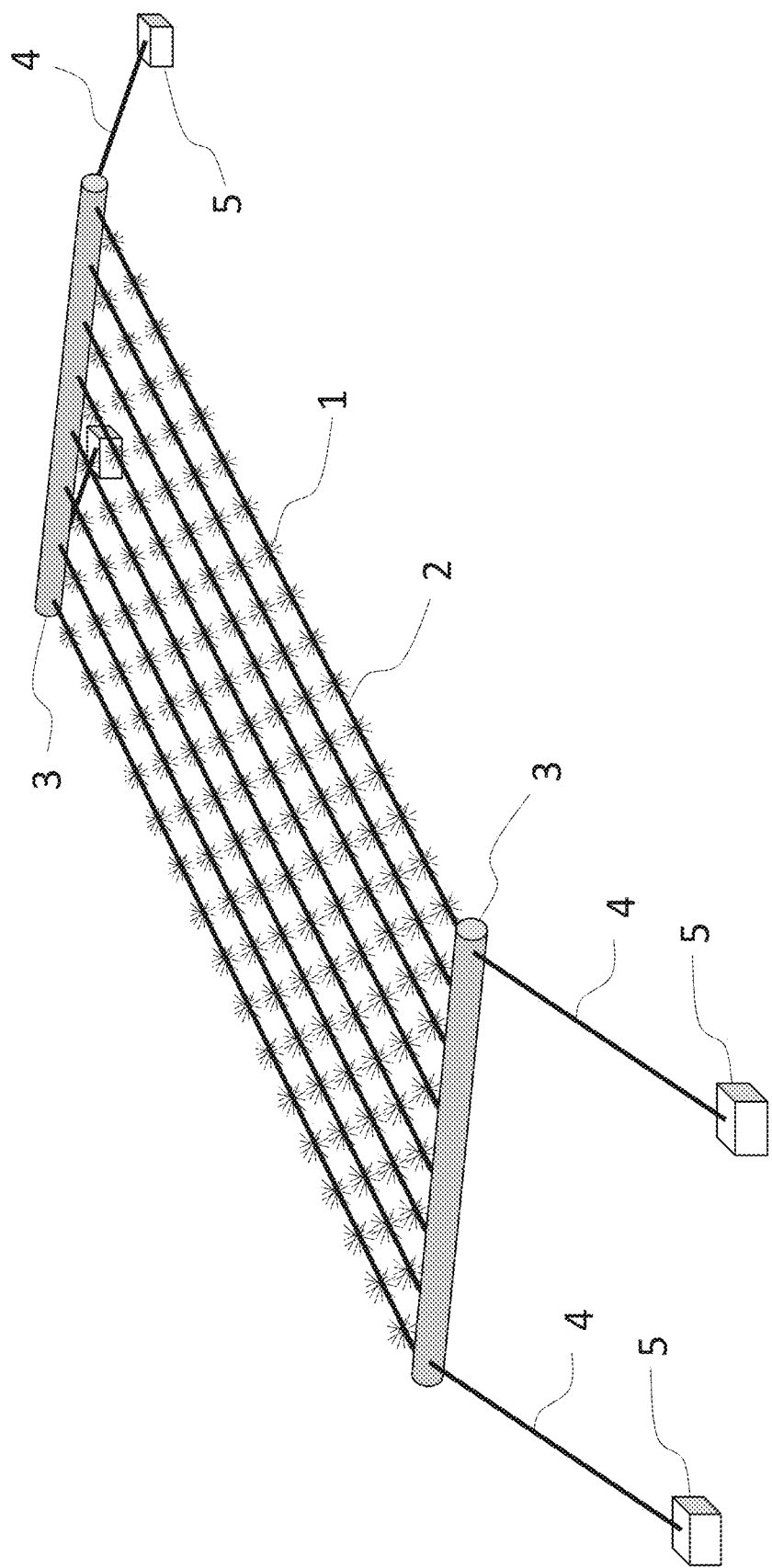
FIG. 1 represents a conventional shallow-water macroalgae farm.

Referring to the Figures in more detail, and particularly referring to FIG. 1, there is shown an example of a conventional shallow-water macroalgae farm where propagules of seaweed 1 is grown on longlines 2 that are supported between two floating tubes 3 that are held in place by anchor lines 4 that lead outward and downward to anchors 5. Each longline 2 is held taut by the outward tension imposed by the anchor lines 4.

Figure 2:
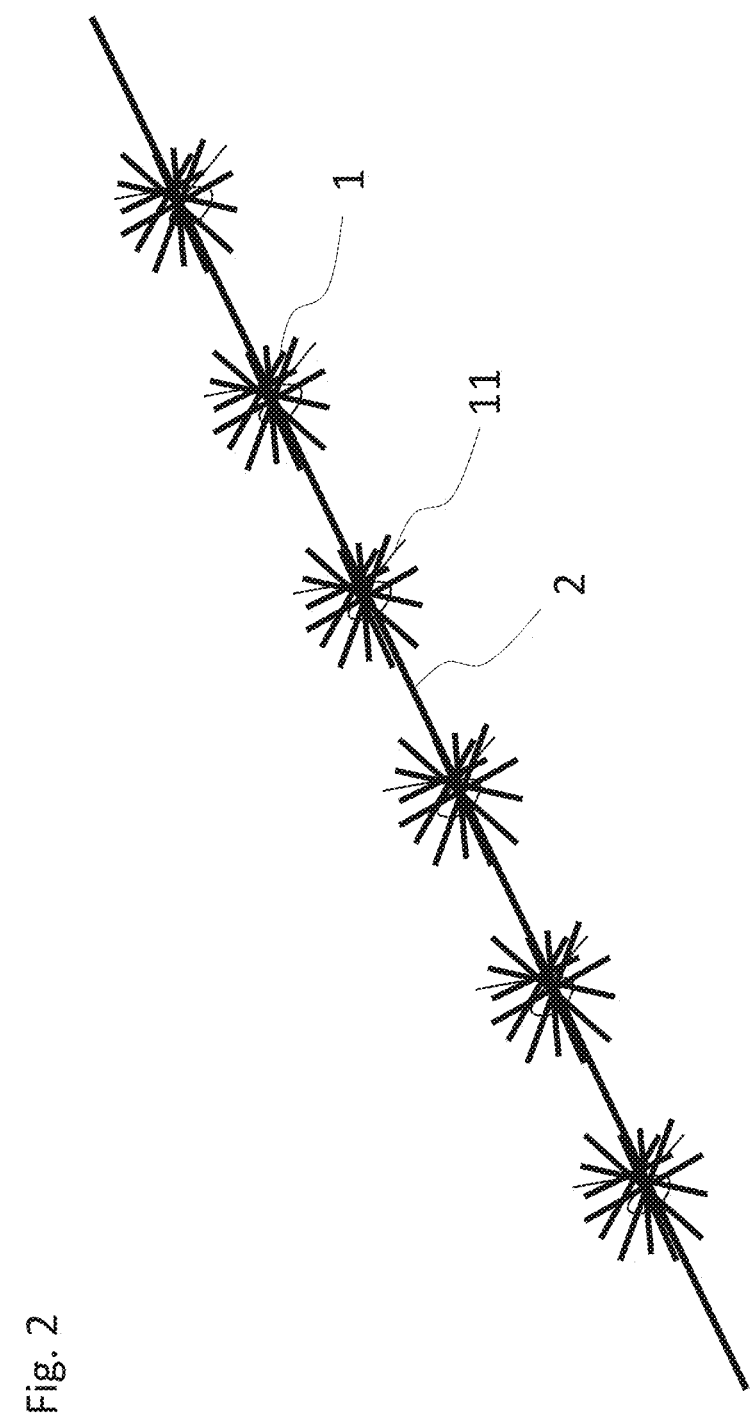
FIG. 2 represents a detail of the farmed seaweed and its conventional attachment.

Referring now to FIG. 2, there is shown a more detailed representation of the propagules 1 and the longline 2. The propagules are spaced along longline 2 a specified distance apart such that as they grow they do not impinge on each other to allow full exposure to sunlight. Also shown in FIG. 2 are the individual pieces of string or light rope 11 that is commonly used to tie the propagules 1 to the longline 2. Such attachment using this method is labor intensive and does not lend itself to mechanization.

Referring now to FIG. 3, there is shown a top view a seaweed clip 15 that is the subject of the exemplary embodiments. The seaweed clip 15 enables the rapid and reliable attachment of a seaweed propagule to a longline. The seaweed clip 15 is a one-piece device that may be composed of a clip portion 20, a tower 22, and a tapered barrel 21. The size of seaweed clip 15 depends on the size of the propagule material being attached and on the diameter of the longline into which it will be inserted. The size of the propagule material dictates the dimensions of the clip portion whereas the diameter of the longline dictates the diameter and length of the tower 22 and a tapered barrel 21. Typically, these constraints suggest a clip 15 that is less that 2" (50 mm) long.

Referring now to FIG. 4, there is shown a side view of the seaweed clip 15. The clip portion 20 of the seaweed clip 15 is curved to form a circular area 24 that is close to the typical diameter of a seaweed propagule (not shown). The clip portion 20 has an opening 23 that is smaller than the encompassed diameter of the circular area 24. In this way the seaweed propagule is securely held by the clip portion 20. The clip portion 20 is supported by tower 22 that is attached to the tapered barrel 21. The tapered barrel 21 may be considered to be oval in shape lengthwise and circular in cross section. Further, the circular cross section of the tapered barrel is greatest equidistant between the ends of the tapered barrel and smallest at the ends of the tapered barrel.

The top of the clip portion 20 may be wider than the thickness of the clip portion 20 to securely hold the seaweed propagule. In one preferred embodiment, the clip portion may have a width that is wider than the largest width of the tapered barrel 21 when viewed from the top of the seaweed clip 15 to, again, securely hold the seaweed propagule.

Referring now to FIG. 5, there is shown a top view of seaweed clip 15 that has been inserted into a longline 16. Longline 16 is preferred to be a hollow braided rope such that the tapered barrel 21 can easily be inserted into the hollow core of the longline 16.

Referring now to FIG. 6, there is shown a side view of seaweed clip 15 that has been inserted into longline 16. From this view it can be seen that the height of tower 22 may be dependent on the size and nature of the rope used for longline 16. Similarly the diameter and length of tapered barrel 21 also may be dependent on the size and nature of the rope used for longline 16. As is apparent to a person skilled in the art, the height of tower 22 and the diameters and length of tapered barrel 21 may be empirically determined based on experience with macroalgae farming.

Clip portion 20 may be shaped with various diameters of the circular area 24 to accommodate different stem diameters of the vegetative propagules. In addition, the opening 23 of clip portion 20 may range from nearly the diameter of the circular area 24 down to full closure with the clip portion 20 needing to be elastically bent open to allow propagule insertion.

The material used for seaweed clip 15 may be made of numerous types of material such as metals or plastics. The clip portion 20 preferably is flexible enough to allow the insertion of the propagule stem without physically damaging the propagule stem. For this reason, plastic material such as nylon, polyethylene, PEEK, ABC, or other polymer may be preferred. These simple devices can be injection molded or 3-D printed. Seaweed clip 15 may be used many times and, while secure in the longline 16 once inserted, it may be removed for transfer to another longline 16 or to adjust the spacing between adjoining seaweed clips.

It will be apparent to those skilled in the art having regard to this disclosure that other modifications of this invention beyond those embodiments specifically described here may be made without departing from the spirit of the invention.

What is claimed is:

1. An apparatus for attaching vegetative propagules to a longline comprising:
    a clip portion having three distinct areas: a curved area sized to receive a stem of the vegetative propagule, an unobstructed opening to the curved area smaller than the curved area to secure the stem of the vegetative propagule in the curved area, and a flared opening extending outwardly from the unobstructed opening;
    a tapered barrel configured to be inserted into a longline wherein the tapered barrel is oval in shape lengthwise and circular in cross section and wherein the circular cross section of the tapered barrel is greatest equidistant between ends of the tapered barrel and smallest at the ends of the tapered barrel; and
    a rigid connection by a tower between the clip portion and the tapered barrel.

2. The apparatus of claim 1 wherein the clip portion has a width that is greater than a thickness of the clip portion.

3. The apparatus of claim 1 wherein the clip portion has a width that is wider than a largest width of the tapered barrel.

4. The apparatus of claim 1 wherein, when the vegetative propagule is inserted into the clip portion, the clip portion is elastically bent further open to provide more space in the unobstructed opening, and when released, the clip portion is at rest with the unobstructed opening securing the stem of the vegetative propagule in the curved area.

5. The apparatus of claim 1 wherein the clip portion is flexible to open to allow the insertion of a stem of the vegetative propagule and then springs back to a smaller opening to prevent the removal of the stem of the vegetative propagule.

6. The apparatus of claim 1 wherein the apparatus comprises a nonmetallic material.

7. A macroalgae farm comprising:
    a longline on which a vegetative propagule may be grown;
    a clip portion having a curved area sized to receive a stem of the vegetative propagule and having an opening to the curved area smaller than the curved area to secure the vegetative propagule in the curved area;
    a tapered barrel that is inserted into the longline; and
    a rigid connection by a tower between the clip portion and the tapered barrel.

8. The macroalgae farm of claim 7 wherein the longline comprises a hollow braided rope.

9. The macroalgae farm of claim 7 wherein the tapered barrel is oval in shape lengthwise and circular in cross section.

10. The macroalgae farm of claim 9 wherein the circular cross section of the tapered barrel is greatest equidistant between ends of the tapered barrel and smallest at the ends of the tapered barrel.

11. The macroalgae farm of claim 7 wherein the clip portion has a width that is greater than a thickness of the clip portion.

12. The macroalgae farm of claim 7 wherein the clip portion has a width that is wider than a largest width of the tapered barrel.

13. The macroalgae farm of claim 7 wherein, when the vegetative propagule is inserted into the clip portion, the clip portion is elastically bent further open to provide more space in the unobstructed opening, and when released, the clip portion is at rest with the unobstructed opening securing the stem of the vegetative propagule in the curved area.

14. The macroalgae farm of claim 7 wherein the clip portion is flexible to open to allow the insertion of a stem of the vegetative propagule and then springs back to a smaller opening to prevent the removal of the stem of the vegetative propagule.

15. The macroalgae farm of claim 7 wherein the apparatus comprises a nonmetallic material.

\* \* \* \* \*